United States Patent
Lynch, Jr. et al.

(10) Patent No.: US 8,023,940 B2
(45) Date of Patent: *Sep. 20, 2011

(54) CONNECTING AD HOC PICONETS TO WIDE AREA NETWORKS AND/OR GRID COMPUTING NETWORKS

(75) Inventors: Jamel P. Lynch, Jr., Carrboro, NC (US); Brent A. Miller, Cary, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/049,191

(22) Filed: Mar. 14, 2008

(65) Prior Publication Data
US 2009/0232048 A1 Sep. 17, 2009

Related U.S. Application Data

(63) Continuation of application No. 10/606,045, filed on Jun. 25, 2003, now Pat. No. 7,406,313.

(51) Int. Cl.
*H04W 4/00* (2009.01)
(52) U.S. Cl. ................... 455/432.2; 370/310
(58) Field of Classification Search ........... 455/450, 455/41.2, 127.4, 432.1, 432.3, 434, 435.1, 455/435.2, 435.3, 436, 440, 442, 443, 444.524, 455/525, 552.1, 553.1
See application file for complete search history.

(56) References Cited

U.S. PATENT DOCUMENTS

| | | |
|---|---|---|
| 6,452,910 B1 | 9/2002 | Vij et al. |
| 7,406,313 B2 | 7/2008 | Lynch, Jr. et al. |
| 2001/0030950 A1 | 10/2001 | Chen et al. |
| 2002/0075941 A1 | 6/2002 | Souissi et al. |
| 2002/0172177 A1 | 11/2002 | Gooch |
| 2003/0139179 A1* | 7/2003 | Fuchs et al. ............... 455/426 |
| 2003/0149794 A1 | 8/2003 | Morris et al. |
| 2004/0202132 A1 | 10/2004 | Heinonen et al. |
| 2004/0266439 A1* | 12/2004 | Lynch et al. ............... 455/444 |
| 2005/0058144 A1 | 3/2005 | Ayyagari et al. |
| 2005/0180343 A1 | 8/2005 | Van Valkenburg |
| 2009/0232047 A1 | 9/2009 | Lynch, Jr. et al. |

OTHER PUBLICATIONS

Gonzalez-Castano et al. "Condor Grid Computing From Mobile Handheld Devices," Mobile Computing and Communications Review, vol. 6, No. 2, Apr. 2002, pp. 18-27.
Morris et al. "Carnet: A Scalable Ad Hoc Wireless Network System," Proccedings of the 9TH ACM SIGOPS European Workshop, Sep. 2000, pp. 61-65.
Phan et al. "Challenge: Integrating Mobile Wireless Devices Into the Computational Grid," MOBICOM '02, Sep. 23-28, 2002, pp. 271-278.

(Continued)

*Primary Examiner* — Rafael Perez Gutierrez
*Assistant Examiner* — Marcos Batista
(74) *Attorney, Agent, or Firm* — Marcia L. Doubet

(57) ABSTRACT

A hyper-scatternet includes a first ad hoc piconet, a second ad hoc piconet and a wide area network, wherein the first and second ad hoc piconets are configured to communicate with one another via the wide area network. Each ad hoc piconet can include an application server that includes an ad hoc piconet interface that is configured to communicate with an ad hoc piconet using an ad hoc piconet protocol, and a wide area network interface that is configured to communicate with a wide area network using a wide area network protocol. The application server also includes a service manifest that is configured to determine ad hoc piconet services that are available from the ad hoc piconet via the ad hoc piconet interface, and to advertise the ad hoc piconet services to the wide area network as wide area network services via the wide area network interface.

13 Claims, 7 Drawing Sheets

OTHER PUBLICATIONS

Jamel P. Lynch, Jr., et al., U.S. Appl. No. 10/606,045, filed Jun. 25, 2003, Office Action, Sep. 21, 2007, 6 pages.

Jamel P. Lynch, Jr., et al., U.S. Appl. No. 10/606,045, filed Jun. 25, 2003, Notice of Allowance, Dec. 7, 2007, 7 pages.

Jamel P. Lynch, Jr., et al., U.S. Appl. No. 10/606,045, filed Jun. 25, 2003, Examiner's Interview Summary, Feb. 19, 2008, 2 pages.

Jamel P. Lynch, Jr., et al., U.S. Appl. No. 10/606,045, filed Jun. 25, 2003, Response to Section 312 Amendment, May 1, 2008, 3 pages.

* cited by examiner

CONNECTING AD HOC PICONETS TO WIDE AREA NETWORKS AND/OR GRID COMPUTING NETWORKS

The present application is a continuation of U.S. patent application Ser. No. 10/606,045, filed on Jun. 25, 2003 now U.S. Pat. No. 7,406,313, and entitled, "Systems, Methods and Computer Program Products for Connecting Ad Hoc Piconets to Wide Area Networks," which is incorporated herein by reference.

FIELD OF THE INVENTION

This invention relates to network communications systems, methods and computer program products, and more particularly to ad hoc piconet systems, methods and computer program products.

BACKGROUND OF THE INVENTION

Ad hoc piconets have recently been developed to provide short range wireless networks for connecting wireless devices and services. As used herein, an ad hoc piconet is a network of wireless devices that exists only when the wireless devices are in close physical proximity to one another. One well known example of an ad hoc piconet is the Bluetooth architecture, which is a low cost, short range wireless specification for connecting mobile devices and services. The Bluetooth architecture is service-oriented, with service metadata being published via the Bluetooth Service Discovery Protocol (BSDP). However, it is well known that the short-range characteristics of Bluetooth wireless communication generally imposes proximity limitations on wireless devices operating within a single piconet.

It is also known to provide interconnectivity of multiple piconets, to provide a scatternet. However, in order to form a scatternet, the piconets generally need to be colocated, with at least one device participating in more than one of the interconnected piconets. Therefore, scatternets still may also be limited by proximity.

Bluetooth devices, including mobile phones, home entertainment systems, MP3 players, automobiles and notebook computers, may provide services to one another within a Bluetooth piconet or scatternet. However, with the increasing use of Bluetooth devices, it may be desirable to provide additional services to and from these devices.

SUMMARY OF THE INVENTION

Some embodiments of the present invention provide a hyper-scatternet that includes a first ad hoc piconet, a second ad hoc piconet and a wide area network, wherein the first and second ad hoc piconets are configured to communicate with one another via the wide area network. Accordingly, hyper-scatternets can span wide geographic distances and need not be limited by the ad hoc piconet radio range. In some embodiments, each ad hoc piconet includes an application server that includes an ad hoc piconet interface that is configured to communicate with an ad hoc piconet using an ad hoc piconet protocol, and a wide area network interface that is configured to communicate with a wide area network using a wide area network protocol. The application server also includes a service manifest that is configured to determine ad hoc piconet services that are available from the ad hoc piconet via the ad hoc piconet interface, and to advertise the ad hoc piconet services to the wide area network as wide area network services via the wide area network interface. It also will be understood that application servers as described above may be used independent of a hyper-scatternet to connect an ad hoc piconet to a wide area network.

In other embodiments, the service manifest is further configured to determine first ad hoc piconet services that are available from the ad hoc piconet via the ad hoc piconet interface and to advertise the first ad hoc piconet services to the wide area network as first wide area network services via the wide area network interface. The service manifest is further configured to determine second wide area network services that are available from the wide area network via the wide area network interface, and to advertise the second wide area network services to the ad hoc piconet as second ad hoc piconet services via the ad hoc piconet interface. In other embodiments, a service invocation authority is responsive to a first service invocation that is received from a client in the wide area network via the wide area network interface, to map the service invocation to the ad hoc piconet protocol, to invoke the service on the ad hoc piconet via the ad hoc piconet interface, to receive a response from the ad hoc piconet and to provide the response to the client using the wide area network protocol via the wide area network interface.

In still other embodiments, the service manifest is further configured to aggregate ad hoc piconet services that are available from multiple clients that are connected to the ad hoc piconet via the ad hoc piconet interface and to advertise the ad hoc piconet services that are aggregated to the wide area network as wide area network services via the wide area network interface. It will be understood that, in some embodiments, the wide area network comprises the World Wide Web, a grid computing network and/or a universal plug-and-play network. In particular, some embodiments of the present invention can provide an ad hoc piconet application server that comprises an ad hoc piconet interface that is configured to communicate with an ad hoc piconet using an ad hoc piconet protocol and a grid computing network interface that is configured to communicate with a grid computing network using Open Grid Services Architecture (OGSA) protocol. A service manifest and/or a service invocation authority may be provided as was described above.

Embodiments of the invention have been described above primarily in connection with networks and server systems. However, other embodiments of the present invention can provide methods and/or computer program products for connecting an ad hoc piconet to a wide area network.

DETAILED DESCRIPTION

Figure 1:
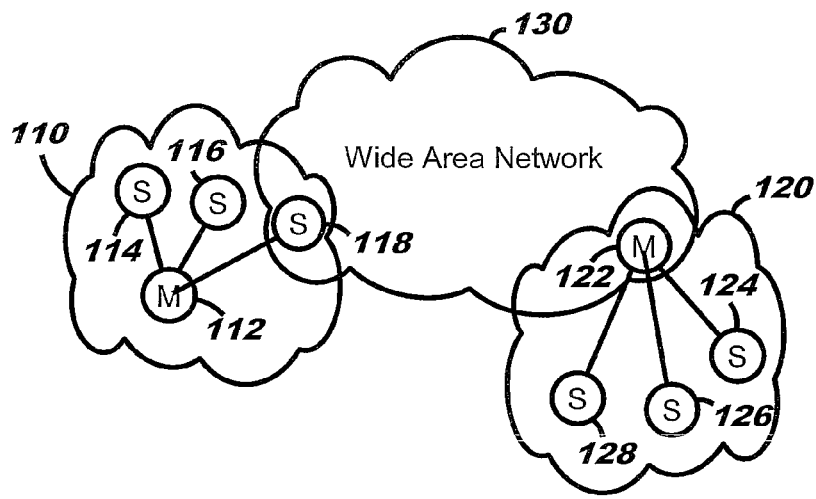
FIG. 1 is a schematic diagram of a hyper-scatternet according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In order to provide a complete detailed description, an overview of systems, methods and computer program products according to embodiments of the present invention will be described. Then, a detailed description of ad hoc hyper-scatternets according to some embodiments of the invention will be provided, followed by a detailed description of grid-enabled ad hoc piconet services that can use hyper-scatternets according to embodiments of the present invention.

Overview

FIG. 1 is a schematic diagram of a hyper-scatternet according to some embodiments of the present invention. As shown in FIG. 1, a hyper-scatternet includes a first ad hoc piconet 110, a second ad hoc piconet 120, and a wide area network 130, wherein the first and second ad hoc piconets 110 and 120 are configured to communicate with one another via the wide area network 130. As shown in FIG. 1, the first ad hoc piconet 110 includes a master 112 and a plurality of slaves 114, 116 and 118. It will be understood that, although the first ad hoc piconet 110 includes only one master 112 and three slaves 114, 116 and 118, more than one master and more or less than three slaves may be provided. One of the slaves 118 is configured to communicate with the wide area network by providing therein an application server, as will be described in detail below. Similarly, the second ad hoc piconet 120 includes a master 122 and a plurality of slaves 124, 126, 128. As was the case with the first ad hoc piconet, more than one master and more or less than three slaves may be provided. Moreover, in the second ad hoc piconet 120, the master is configured to communicate with the wide area network 130 by providing therein an application server, as will be described below. It also will be understood that multiple wide area networks may be provided and more than two ad hoc piconets may be provided. Moreover, a single ad hoc piconet 110 or 120 may be connected to a wide area network without the need for a second ad hoc piconet.

Figure 2:
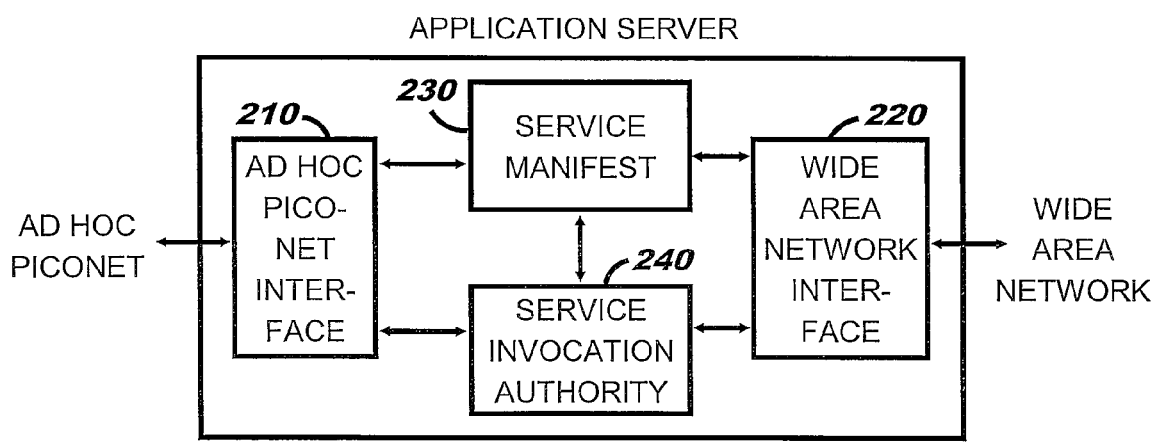
FIG. 2 is a block diagram of an application server according to some embodiments of the present invention.

FIG. 2 is a block diagram of an application server according to some embodiments of the present invention. The application server of FIG. 2 may be contained, for example, in slave 118 and/or master 122 of FIG. 1.

Referring now to FIG. 2, the application server includes an ad hoc piconet interface 210 that is configured to communicate with an ad hoc piconet, such as the ad hoc piconet 110 and/or 120 of FIG. 1, using an ad hoc piconet protocol. A wide area network interface 220 is configured to communicate with a wide area network, for example the wide area network 130 of FIG. 1, using a wide area network protocol. A service manifest 230 is configured to determine ad hoc piconet services that are available from the ad hoc piconet via the ad hoc piconet interface 210, and to advertise the ad hoc piconet services to the wide area network as wide area network services via the wide area network interface 220.

Still continuing with the description of FIG. 2, in other embodiments, the service manifest 230 is further configured to determine first ad hoc piconet services that are available from the ad hoc piconet via the ad hoc piconet interface 210, and to advertise the first ad hoc piconet services to the wide area network 130 as first wide area network services, via the wide area network interface 220. The service manifest 230 is also configured to determine second wide area network services that are available from the wide area network via the wide area network interface 220, and to advertise the second wide area network services to the ad hoc piconet as second ad hoc piconet services via the ad hoc piconet interface 210.

Still other embodiments of the present invention can also provide a service invocation authority 240. In some embodiments, the service invocation authority is responsive to a service invocation that is received from a client in the wide area network via the wide area network interface 220. The service invocation authority 240 is configured to map the service invocation to the ad hoc piconet protocol, to invoke the service on the ad hoc piconet via the ad hoc piconet interface 210, to receive a response from the ad hoc piconet and to provide the response to the client using the wide area network protocol via the wide area network interface 220.

In further embodiments of the present invention, the service invocation authority 240 is responsive to a first service invocation for a first service that is received from a first client in the wide area network via the wide area network interface 220, and is configured to map the first service invocation to the ad hoc piconet protocol, to invoke the first service on the ad hoc piconet via the ad hoc piconet interface, to receive a first response from the ad hoc piconet and to provide the first response to the first client using the wide area network protocol via the wide area network interface 220. The service invocation authority 240 also is responsive to a second service invocation for a second service that is received from a second client in the ad hoc piconet via the ad hoc piconet interface 210, to map the second service invocation to the wide area network protocol, to invoke the second service on the wide area network via the wide area network interface 220, to receive a second response from the wide area network and to provide the second response to the second client using the ad hoc piconet protocol via the ad hoc piconet interface.

According to yet other embodiments of the present invention, the service manifest 230 is further configured to aggregate ad hoc piconet services that are available for multiple clients that are connected to the ad hoc piconet via the ad hoc piconet interface 210. The service manifest 230 is further configured to advertise the ad hoc piconet services that are aggregated to the wide area network as wide area network services via the wide area network interface.

Figure 3:
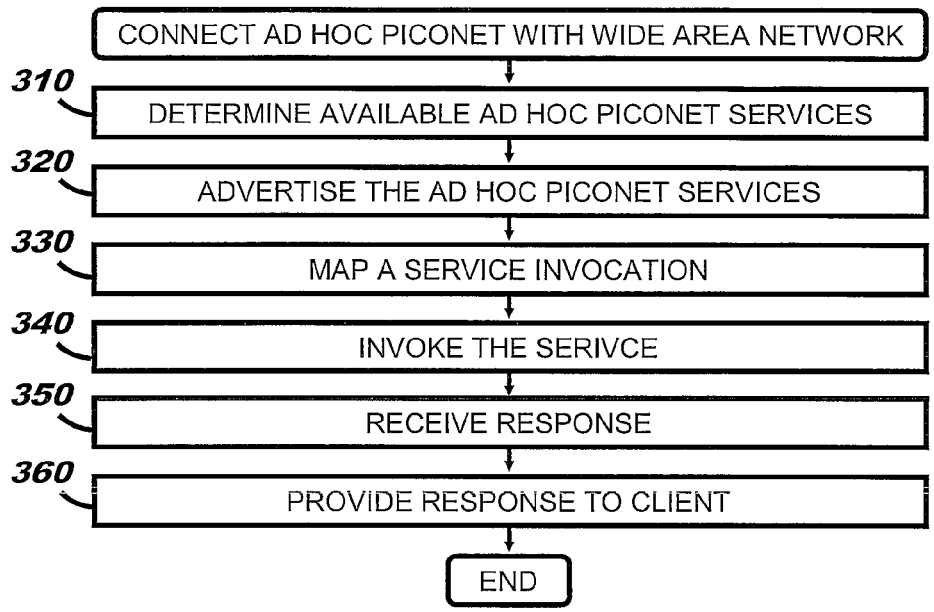
FIG. 3 is a flowchart of operations to connect ad hoc piconets with wide area networks according to some embodiments of the present invention.

FIG. 3 is a flowchart of operations that may be used to connect an ad hoc piconet with a wide area network according to some embodiments of the invention. These operations may be performed, for example, by the service manifest 230 and/or the service invocation authority 240 of FIG. 2.

Referring to FIG. 3, at Block 310, ad hoc piconet services that are available from the ad hoc piconet are determined. At Block 320, the ad hoc piconet services that are available are advertised to the wide area network as wide area network services. At Block 330, a service invocation that is received from a client in the wide area network is mapped to an ad hoc piconet protocol. At Block 340, the service is invoked on the ad hoc piconet, and at Block 350, a response is received from the ad hoc piconet. Finally, at Block 360, a response is provided to the client using a wide area network protocol.

Ad Hoc Hyper-Scatternets

Ad hoc hyper-scatternets using web services according to embodiments of the present invention now will be described. As was described above, Bluetooth (Bluetooth is a trademark of the Bluetooth Special Interest Group Inc.) technology is a low-cost short-range wireless specification for connecting mobile devices and services. The Bluetooth architecture is service-oriented, with service metadata being published via the Bluetooth service discovery protocol (BSDP), and it facilitates ad hoc networking of mobile devices. The short-range characteristics of Bluetooth wireless communication generally impose proximity limitations on mobile devices operating within a single piconet. As is well known, Bluetooth piconet includes two or more devices in radio proximity range (nominally 10 meters) with established Bluetooth communication links. A piconet includes one master device and up to seven active slave devices, with the possibility for additional idle slaves. Inter-connectivity of multiple piconets, known as scatternets, generally requires the relative colocation of piconets, with at least one device participating in more than one of the interconnected piconets. Scatternets still generally are limited by proximity wherein each communicating device generally must be within radio range (nominally 10 meters) of all other devices that it communicates with.

Bluetooth devices, including mobile phones, home entertainment systems, MP3 players, automobiles and notebook computers, may provide services to one another within a Bluetooth piconet or scatternet. A hyper-scatternet according to embodiments of the invention is an interconnection of Bluetooth piconets irrespective of proximity constraints. Hyper-scatternets can span wide geographic distances. They need not be limited by the Bluetooth radio range. This can be achieved by leveraging open Internet standards and Web services to host a Distributed Piconet Coupling (DPC). Bluetooth wireless communication and Web services standards and technologies, in particular Bluetooth Service Discovery (BSDP), Bluetooth baseband specification, Simple Object Access Protocol (SOAP), Web Services Description Language (WSDL) and Web Services Inspection Language (WSIL) are well known to those skill in the art. However, some background information about BSDP is provided below, to facilitate an understanding of embodiments of the invention.

When a Bluetooth device first joins a piconet, many other devices in the piconet might be offering services that it wishes to use. Bluetooth devices that offer services maintain a database of those services. BSDP uses Bluetooth connections that are established using the Bluetooth baseband inquiry and paging operations. The inquiry operation allows a Bluetooth device to determine the device class of neighboring Bluetooth devices, but this may provide only high-level information (such as that the device is a telephone, rendering or networking device). BSDP transactions may need to obtain finer-grained information about the services that the device offers.

BSDP uses messages exchanged over an Asynchronous Connection-Less (ACL) link to obtain detailed information about services that devices offer and how to access those services. A device searching for services in the area is a BSDP client; a device offering services is a BSDP server. Devices can be both clients (using services) and servers (offering services). Because BSDP uses ACL connections, devices establish a connection with each other (using the inquiry and paging operations noted earlier) before they can exchange BSDP information.

Figure 4:
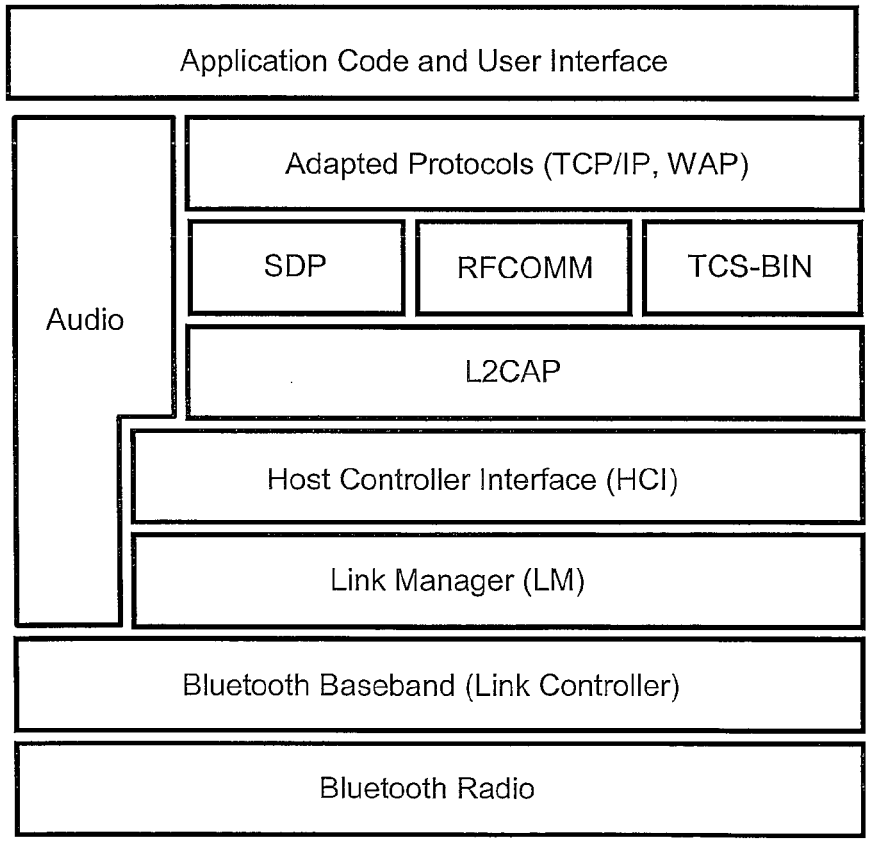
FIG. 4 is a schematic diagram of a Bluetooth protocol stack.

FIG. 4 shows the position of BSDP (labelled as "SDP") in the Bluetooth protocol stack. BSDP relies on the Logical Link Control & Adaptation Protocol (L2CAP) layer of the protocol stack, as shown in FIG. 4. After establishing an L2CAP connection, BSDP can be used to find out about services and how to connect to them. BSDP generally does not handle connections to services, but it provides information about them. To find and connect to a service offered by a BSDP server, a client:

Establishes an L2CAP connection;
Searches for specific class(es) of service(s);
Retrieves service attributes, including an attribute (called ProtocolDescriptorList) that describes how to connect to the service; and
Establishes a separate (non-BSDP) connection to use the service.

First an L2CAP connection is established (a baseband ACL link is established first). This L2CAP connection is used specifically for BSDP traffic. A BSDP service search attribute request can be sent to request attributes of a specific service, such as a dial-up networking (DUN) service. The BSDP server returns the service record for the DUN service. Once the service record is received, the L2CAP connection for BSDP no longer is needed. Because it was established specifically for BSDP traffic, it is not used to communicate with any other service, so it can be disconnected. In addition to searching for specific services in the vicinity, a BSDP client also can browse for all services available in the vicinity, but this operation need not be materially different from the service search process just described.

It should be noted that BSDP is a protocol specific to Bluetooth technology, and it can generally discover only services offered by other Bluetooth devices in the piconet. In general, neither services described by other (non-BSDP) representations and protocols nor services in other piconets (even BSDP services in other piconets) can be discovered using BSDP.

Figure 5:
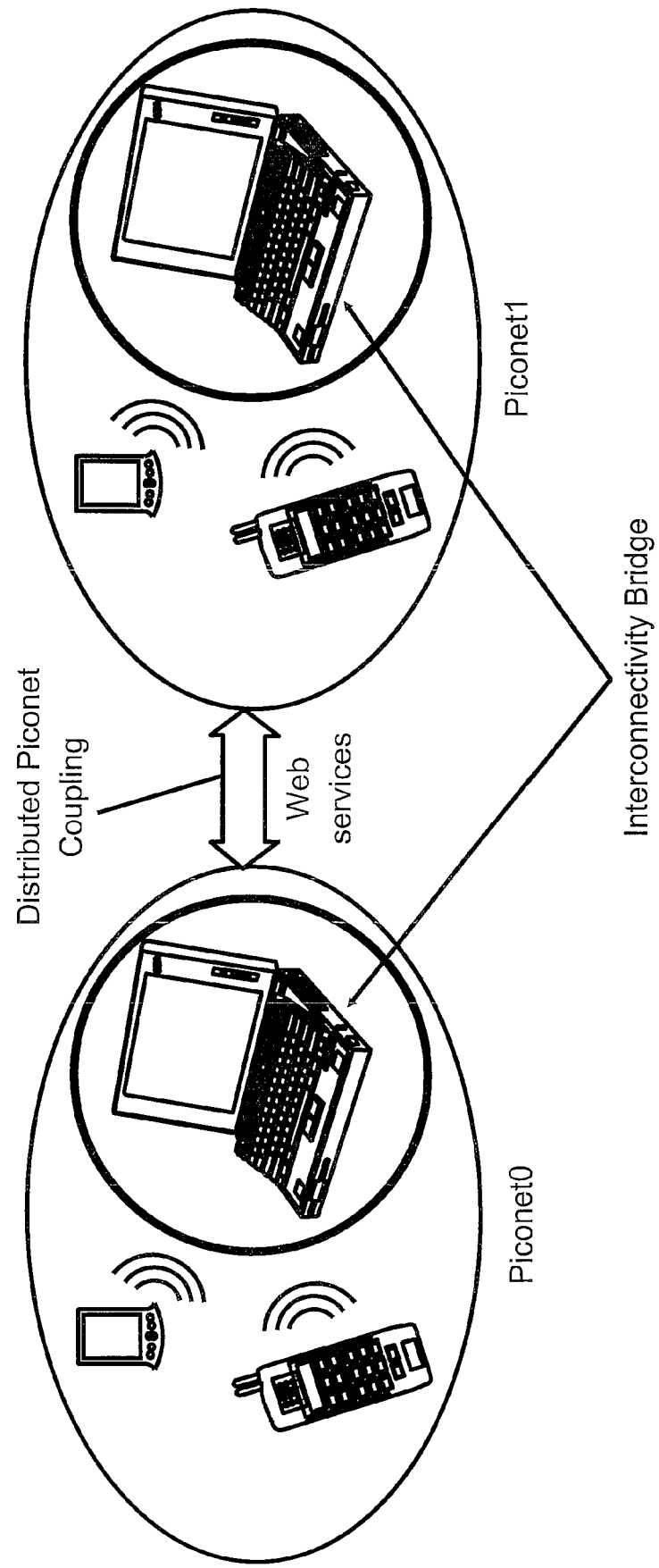
FIG. 5 is a block diagram of ad hoc hyper-scatternets according to other embodiments of the present invention.

As illustrated in FIG. 5, distributed piconet coupling is a logical component of a hyper-scatternet that is composed of Bluetooth and Web services artifacts. Each piconet participating within a hyper-scatternet hosts an interconnectivity bridge (a form of an application server) that contains the components described below and depicted in FIG. 6:

Bluetooth Relay 610—The Bluetooth relay is a Bluetooth service that has joined the context piconet and is capable of issuing Bluetooth service queries and service invocations using BSDP. Upon receiving a request to discover local Bluetooth services, the Bluetooth relay performs service discovery using the Bluetooth Service Discovery Protocol (BSDP), which locates and gathers information about other Bluetooth devices and services in the context piconet. The Bluetooth relay also has connectivity to a larger network that can carry Web services protocols. The Bluetooth relay component 610 participates in both the Bluetooth piconet and the larger network, and it generates and understands both Bluetooth and Web services protocols. The Bluetooth relay is defined as a service (or set of services). These services often will be instantiated within a physical device. Examples of typical devices that might offer Bluetooth relay services are notebook computers and Bluetooth network access points.

Service Manifest 620—The service manifest can dynamically generate WSIL documents that reference WSDL descriptions of accessible services within the context piconet. An exemplary service manifest is a servlet deployed within a Web application server 650 that responds to Web services inspection requests. For example, consider a home network including a home entertainment system and a home security system. The service manifest servlet could respond to the URL reference daves-house.com/service/bluetooth/manifest.wsil with the following dynamically generated WSIL document. Note that in the following XML code, the symbols "<" and ">" have been replaced with "(" and ")" respectively, and the nomenclature "http" has been replaced by "X", so as to render any otherwise executable code non-extendable by a web browser which displays a web page containing the text of the specification:

```
(?xml version="1.0"?)
(inspection xmlns="X://schemas.xmlsoap.org/ws/2001/10/inspection/"
xmlns:wsiluddi="X://schemas.xmlsoap.org/ws/2001/10/inspection/uddi/")
(service)
    (abstract)Dynamically Generated Bluetooth Home Entertainment
System Service(/abstract)
    (description referencedNamespace="X://schemas.xmlsoap.org/wsdl/"
    Location=
        "X://www.daves-house.com/service/bluetooth/home.entertainment.-
        wsdl"/)
    (/service)
    (service)
    (description referencedNamespace="X://schemas.xmlsoap.org/wsdl/"
    Location=
        "X://www.daves-house.com/service/bluetooth/home.security.-
        system.wsdl"/)
    (/service)
(/inspection)
```

The generated WSIL document contains service references to the two Bluetooth services (entertainment system and security system) that are described in a Web service description (WSDL) document. The following Web service description documents might exist for the home entertainment service:

```
(Home Entertainment Service WSDL interface document)
(?xml version="1.0" encoding="UTF-8"?)
(definitions name="davesMultimediaService"
    targetNamespace="X://www.daves-
    house.com/service/bluetooth/davesMultimediaService/"
    xmlns="X://schemas.xmlsoap.org/wsdl/"
    xmlns:soap="X://schemas.xmlsoap.org/wsdl/soap/"
    xmlns:soapenc="X://schemas.xmlsoap.org/soap/encoding/"
    xmlns:tns="X://www.daves-house.com/service/bluetooth/
    davesMultimediaService/"
    xmlns:xsd="X://www.w3.org/2001/XMLSchema")
(documentation)
```

This WSDL file was generated by ServiceManifest@www.daves-house.com for Bluetooth Service-davesMultimediaService

```
(/documentation)
(message name="SearchIn")
    (part name="query" type="xsd:string"/)
(/message)
(message name="SearchOut")
    (part name="result" type="xsd:string[ ]"/)
(/message)
(message name="StreamMediaIn")
    (part name="mediaID" type="xsd:string"/)
(/message)
(message name="StreamMediaOut")
    (part name="stream" type="xsd:byte[ ]"/)
(/message)
(message name="downloadMediaIn")
    (part name="mediaID" type="xsd:string"/)
(/message)
(message name="downloadMediaOut")
    (part name="mediaURI" type="xsd:anyURI"/)
(/message)
(message name="uploadMediaIn")
    (part name="mediaID" type="xsd:string"/)
    (part name="mediaBuffer" type="xsd:byte[ ]"/)
(/message)
(message name="uploadMediaOut")
    (part name="success" type="xsd:boolean"/)
(/message)
(portType name="davesMultimediaService-Service")
    (operation name="search")
        (input message="tns:SearchIn"/)
        (output message="tns:SearchOut"/)
    (/operation)
    (operation name="streamMedia")
        (input message="tns:StreamMediaIn"/)
        (output message="tns:StreamMediaOut"/)
    (/operation)
    (operation name="downloadMedia")
        (input message="tns:DownloadMediaIn"/)
        (output message="tns:DownloadMediaOut")
    (/operation)
    (operation name="uploadMedia")
        (input message="tns:UploadMediaIn"/)
        (output message="tns:UploadMediaOut"/)
    (/operation)
(/portType)
(binding name="davesMultimediaServiceServiceBinding"
    type="tns:davesMultimediaService-Service")
    (soap:binding style="rpc" transport="X://schemas.xmlsoap.org/soap/X"/)
            (operation name="search")
    (soap:operation soapAction="X://www.daves-house/
    davesMultimediaService"/)
    (input)
        (soap:body encodingStyle="X://schemas.xmlsoap.org/soap/
        encoding/"
            namespace="X://www.daves-house.com/
            davesMultimediaService" use="encoded"/)
    (/input)
    (output)
        (soap:body encodingStyle="X://schemas.xmlsoap.org/soap/
        encoding/"
```

-continued

```
        namespace="X://www.daves-house.com/
        davesMultimediaService" use="encoded"/)
    (/output)
  (/operation)
  (operation name="streamMedia")
    (soap:operation soapAction="X://www.daves-house/
    davesMultimediaService"/)
    (input)
      (soap:body encodingStyle="X://schemas.xmlsoap.org/soap/
      encoding/"
          namespace="X://www.daves-house.com/
          davesMultimediaService" use="encoded"/)
    (/input)
    (output)
      (soap:body encodingStyle="X://schemas.xmlsoap.org/soap/
      encoding/"
          namespace="X://www.daves-house.com/
          davesMultimediaService" use="encoded"/)
    (/output)
  (/operation)
  (operation name="downloadMedia")
    (soap:operation soapAction="X://www.daves-house/
    davesMultimediaService"/)
    (input)
      (soap:body encodingStyle="X://schemas.xmlsoap.org/soap/
      encoding/"
          namespace="X://www.daves-house.com/
          davesMultimediaService" use="encoded"/)
    (/input)
    (output)
      (soap:body encodingStyle="X://schemas.xmlsoap.org/soap/
      encoding/"
          namespace="X://www.daves-house.com/
          davesMultimediaService" use="encoded"/)
    (/output)
  (/operation)
  (operation name="uploadMedia")
    (soap:operation soapAction="X://www.daves-house/
    davesMultimediaService"/)
    (input)
      (soap:body encodingStyle="X://schemas.xmlsoap.org/soap/encoding/"
          namespace="X://www.daves-house.com/
          davesMultimediaService" use="encoded"/)
    (/input)
    (output)
      (soap:body encodingStyle="X://schemas.xmlsoap.org/soap/
      encoding/"
          namespace="X://www.daves-house.com/
          davesMultimediaService" use="encoded"/)
    (/output)
  (/operation)
  (/binding)
(/definitions)
```

(Home Entertainment Service WSDL Implementation Document)

```
(?xml version="1.0"?)
(definitions name="NotificationService"
  targetNamespace="X://www.daves-house.com/service/bluetooth/
davesMultimediaService-impl/"
  xmlns:xsd="X://www.w3.org/2001/XMLSchema"
  xmlns:soap="X://schemas.xmlsoap.org/wsdl/soap/"
  xmlns:interface="X://www.daves-house.com/service/bluetooth/
  davesMultimediaService/"
  xmlns="X://schemas.xmlsoap.org/wsdl/")
  (service name="davesMultimediaService-Service")
    (port name="port0"
    binding="interface:davesMultimediaServiceServiceBinding")
      (soap:address location="X://www.daves-house.com/service-invocation-
authority/davesMultimediaService"/)
    (/port)
  (/service)
(/definitions)
```

Service Invocation Authority (SIA) 630—The service invocation authority is a logical component which includes multiple Java classes which have been generated and deployed dynamically by the service manifest, resulting in Java API calls to the bluetooth relay service. The deployed web services run within the context of an AXIS SOAP runtime in an AXIS Server 640. Each generated class can support SOAP operations which, when invoked results in a call to the Bluetooth Relay service via a Java API. The SIA will return a SOAP response message which has been translated from a Bluetooth response by the Bluetooth relay. Bluetooth services are represented as sets of (attribute, value) pairs carried by the Bluetooth Service Discovery Protocol (which in turn is carried by other protocols in the Bluetooth protocol stack).

As described below, these Bluetooth protocols could be tunneled inside Web services protocols. In simple piconet-to-piconet hyper-scatternet scenarios, the SIA could be a single Java component that processes all invocation requests and returns results to the remote piconet by tunneling (unmodified) Bluetooth service data within SOAP calls and SOAP attachments.

Figure 7:
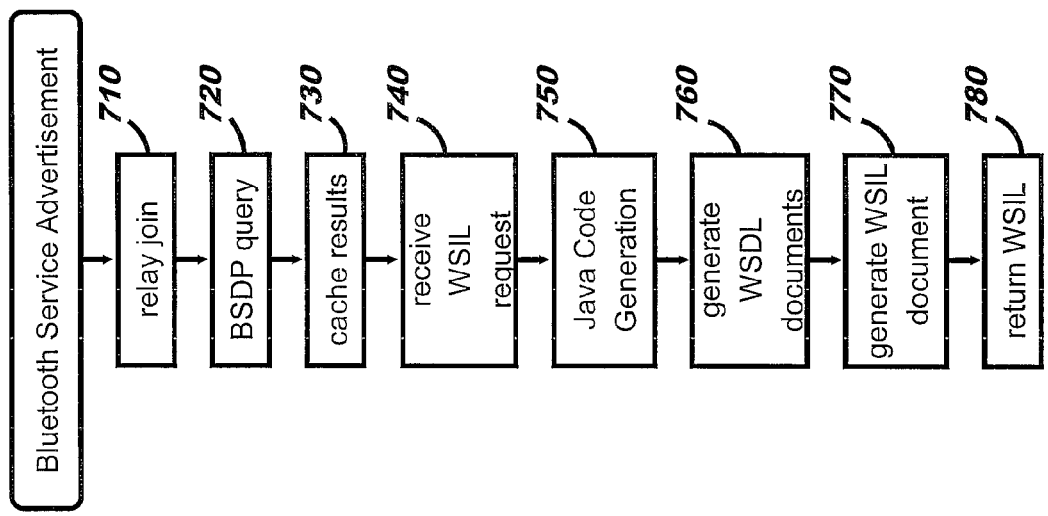
FIGS. 7-9 are flowcharts of operations that may be performed according to embodiments of the present invention.

An 8-stage service advertisement process according to embodiments of the present invention, is illustrated in FIG. 7. In these embodiments, Bluetooth services are dynamically published as Web service implementations:

1. Relay Join (Block 710): The Bluetooth relay device joins a local Bluetooth piconet.
2. BSDP Query (Block 720): The Bluetooth relay issues a Bluetooth service discovery query to other device(s) in the piconet and resolves the available Bluetooth service(s) based on the responses from the other device(s) in the piconet.
3. Cache Results (Block 730): The Bluetooth relay device forwards the descriptions of the service(s) obtained in operation 2 (service metadata) to a repository that is accessible to the service manifest.
4. Receive WSIL request (Block 740): The service manifest servlet is invoked when the application server receives the appropriate X request (such as daves-house.com/service/bluetooth/manifest.wsil in the previous example).
5. Java Code Generation (Block 750): The service manifest servlet generates a Java class for each service identified in stage 2. These Java classes have public methods with signatures that model operations defined by Bluetooth profiles that are supported by the identified services. Each Java class is deployed as a SOAP service within the AXIS runtime with a Web service name that is mapped to the corresponding Bluetooth service identifier. As is well known to those having skill in the art, a Bluetooth profile is a formalized Bluetooth usage model. Bluetooth profiles describe how to use the Bluetooth protocol stack to accomplish the usage model, and in so doing, they specify the Bluetooth service record that describes the Bluetooth service(s) used for that profile. The most common Bluetooth usage models have corresponding profiles.
6. Generate WSDL Document (Block 760): The service manifest servlet generates corresponding WSDL documents for each of the Bluetooth services cached in operation 3 above.
7. Generate WSIL Document (Block 770): The service manifest servlet generates a WSIL document that references the previously generated WSDL documents.
8. Return WSIL document (Block 780): The servlet then returns the generated WSIL document to the requester. The requester now has access to Web service descriptions and representations of the original underlying Bluetooth service(s). These services can be accessed by the requester using Web services protocols and operations. Note that the requester need not be a part of the Bluetooth piconet. Indeed, the requester need not have any support of or knowledge about Bluetooth services or Bluetooth wireless communications. It may only be able to see and use only Web services descriptions and operations.

It will also be understood that a process similar to the reverse of the service advertisement process flow just described could be used to advertise existing Web services (that might be found in a UDDI registry somewhere outside the context piconet) to devices in the local Bluetooth piconet.

Figure 8:
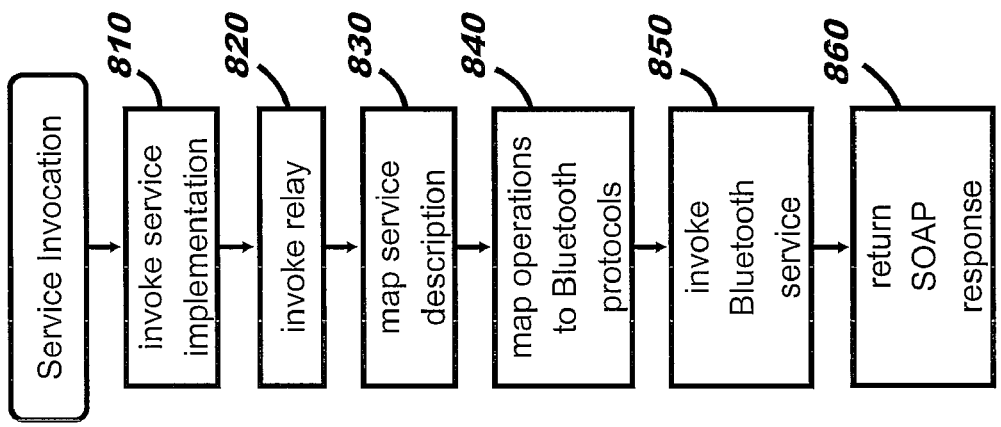

Once a Bluetooth service has been discovered and advertised as a Web service, for example, using the process flow just described, it then can be invoked by a standard Web services client. FIG. 8 is a flowchart of a 6-stage service invocation according to some embodiments of the present invention. In these embodiments, Web service clients access remote Bluetooth devices via SOAP message calls as follows:

1. Invoke Service Implementation (Block 810): Initially the AXIS runtime invokes the underlying Java implementation code upon receiving the required X request. This is a common component that is invoked for all services. It passes the appropriate parameters to the relay (it is not service-specific).
2. Invoke Relay (Block 820): The generated Java code representing the invoked SOAP operation invokes the service relay as a standard Web service. The relay acts as the Web service proxy for the actual Bluetooth service that is invoked later in Block 850.
3. Map service description (Block 830): The Bluetooth relay recognizes that the service being invoked actually is a Bluetooth service that previously was discovered and cached in Blocks 720 and 730 of the Bluetooth service advertisement process flow of FIG. 7. The relay maps the Web service description to the Bluetooth service description to find the matching Bluetooth service for the Web service being invoked. The service name in the WSDL document is mapped to the ServiceName attribute of the Bluetooth service and the messages, bindings, port types and operations present in the Web services description collectively can be used to determine the Bluetooth profile associated with the Bluetooth service. In the Bluetooth service representation, this is the SupportedProfileLists attribute. Other Bluetooth service attributes, including the ServiceClass and ServiceID attributes, could also be used in this mapping operation. In the previous example of a WSDL document for a home entertainment system, the service name (davesMultimediaService) maps to the Bluetooth ServiceName attribute that was retrieved and cached during the service advertisement process. The WSDL messages, bindings, port types and operations are used to derive the association of the Bluetooth multimedia (home entertainment) service with its corresponding Bluetooth Rich Audio/Video profile.
4. Map operations to Bluetooth protocols (Block 840): Having mapped the Web service being invoked to the corresponding Bluetooth service in the context piconet, the relay next maps the operation(s) specified in the Web services SOAP message to the corresponding Bluetooth protocols that will be used to perform those operations within the Bluetooth service. The ProtocolDescriptorList attribute of the Bluetooth service (that was previously cached in the relay, in Block 730 of the Bluetooth service advertisement process flow of FIG. 7) defines the Bluetooth protocol stack used to access that service. The relay maps the SOAP operations to corresponding commands to the Bluetooth service. These commands then are carried over this Bluetooth protocol stack. Referring again to the previous home entertainment system example, the SOAP operation downloadmedia is mapped to the corresponding Bluetooth protocol stack specified in the Rich Audio/Video Profile that is implemented by the home entertainment system, causing AV control commands to be generated and carried over the Bluetooth RFCOMM/L2CAP protocol layers that result in downloading the specified media file to the home entertainment system. Similarly, the SOAP operation streamMedia causes the downloaded media file to be streamed over the Bluetooth baseband. Refer to FIG. 4 for a diagram of the Bluetooth protocol stack.
5. Invoke Bluetooth service (Block 850): Using the mappings just described in Blocks 830 and 840, the relay then generates the appropriate commands and Bluetooth packets to communicate with the Bluetooth service in the context piconet. In the home entertainment system example, this might involve generating a download media from specified URL command that is passed to the Bluetooth RFCOMM layer (the implementation of the Bluetooth protocol stack would then generate the L2CAP and baseband packets to transmit these commands to the Bluetooth service); then using the Bluetooth HCI layer to stream the downloaded media to the Bluetooth service over the Bluetooth baseband layer. Refer to FIG. 4 for a diagram of the Bluetooth protocol stack.
6. Return SOAP response (Block 860): Depending on the type of service being invoked, the service itself might or might not return completion status information. The Bluetooth protocol stack implementation on the relay, however, should in all cases return some type of completion status information once it has carried out the commands generated by the relay. The relay collects the completion status information from its Bluetooth protocol stack implementation and the invoked service, if any, and returns a corresponding SOAP response to the Web service client that invoked the service.

It will also be understood that a process similar to the reverse of the service invocation process flow just described could be used to allow Bluetooth devices in the local piconet to invoke Web services outside the context piconet, using inverse mappings of those described in Blocks 830 and 840.

Some embodiments of the invention can provide simple remote piconet bridging. Hyper-scatternets can be created with a Bluetooth relay device that has no service manifest component and no capability to translate between Web services and Bluetooth service descriptions. The raw Bluetooth protocols can be tunneled inside SOAP messages from one Bluetooth piconet to another. This allows Bluetooth devices in one piconet to communicate with Bluetooth devices in another piconet that could be far removed (well outside the range of normal direct Bluetooth RF communication). Hence, Bluetooth devices could invoke services on other piconets that would not otherwise be available to them without the interconnectivity bridge. This might be especially useful for small, resource-constrained devices that do not have sufficient computational or storage capability to perform the WSDL and WSIL generation and the service description and operation mappings. Thus, some embodiments of the present invention could allow devices such as PDAs, mobile phones and pagers to serve as interconnectivity bridges.

Other embodiments of the invention, which include the service manifest component with WSDL and WSIL generation and service description and operation mappings on a robust interconnectivity bridge, can generate hyper-scatternets that can interoperate using Web services. This can bring the full power of Web services to Bluetooth piconets that are composed of devices that cannot or do not natively support Web services. By exposing Bluetooth services as Web services, the interconnectivity bridge not only allows remote clients to access those services (as described above in the remote piconet bridging case), but also allows the clients to use standard Web services protocols and descriptions to do so. The fact that the services that are discovered and accessed happen to use Bluetooth protocols can be hidden from the service client. It uses the same Web services protocols to access the Bluetooth services as it does to access other Web services. Moreover, as described below, this same idea can be applied to other service-oriented architectures besides Bluetooth protocols. Thus, more services can appear to more clients, yet those clients do not need to implement multiple protocols to find and use those services.

Still other embodiments of the invention can provide the inverse of what was described above. That is, the interconnectivity bridge not only advertises Bluetooth services as Web service, but also consumes Web service advertisements and advertises these to the context Bluetooth piconet using BSDP. The interconnectivity bridge can also enable the local Bluetooth devices to invoke the advertised Web services. In both cases, the process can directly mirror the two process flows described earlier (FIGS. 7 and 8). Because the interconnectivity bridge supports Web services protocols and BSDP, it can search for Web services, perhaps in a UDDI registry, in response to a BSDP query from a local Bluetooth device, and it can act as a BSDP server to respond to the Bluetooth device with information about the Web service, again using BSDP. This is similar to the reverse of the service advertisement process flow (FIG. 7) described earlier. Similarly, the interconnectivity bridge could then accept commands from the local Bluetooth device using the Bluetooth protocol stack and translate these to SOAP operations on the Web service. This is similar to the reverse of the service invocation process flow (FIG. 8) described earlier, with inverse mappings being applied for the service descriptions and operations.

A result is that devices in a piconet can avail themselves of additional services that would not otherwise be available to them, because not only are those services offered outside their own piconet, they also are offered as Web services, not Bluetooth services. One example is a Bluetooth PDA accessing a Lotus Notes calendar application. The Notes calendar application might exist on a PC or server that isn't part of the local piconet, but if that Notes calendar application is exposed as a Web service, then it can be accessed by any devices that can consume Web services. One such device is the interconnectivity bridge, which in turn can represent the Notes calendar service as a Bluetooth service to the Bluetooth PDA, using Bluetooth protocols, including BSDP. The PDA then uses Bluetooth protocols to invoke the service, just as if it were a local Bluetooth service, since the interconnectivity bridge maps the Bluetooth protocol commands to SOAP operations on the Web service.

Embodiments of the invention can be instantiated to bridge to protocols and technologies other than Bluetooth—for example, UPnP™ (UPnP is a trademark of the Universal Plug and Play Implementers Corporation) networks. Although embodiments of the invention described above perform Bluetooth piconet to Web services bridging, the principles of the invention could be applied to perform "Protocol X" to Web services bridging as well.

Embodiments of the invention also can provide the ability to interconnect multiple, diverse, geographically distributed Bluetooth piconets via interconnectivity bridges using Web services protocols. Bluetooth technology does not by itself offer this function; Bluetooth technology typically is implemented in small, mobile, resource-constrained devices that cannot afford to have robust Web services stacks. By using the interconnectivity bridge defined in this invention, Bluetooth piconets that otherwise could not communicate are able to do so.

Embodiments of the invention can also provide hybrid and virtual Bluetooth services. In particular, services offered by Bluetooth devices can become available not only to other Bluetooth devices in the piconet but also to other, remote devices, which might or might not be part of some other Bluetooth piconet. Moreover, services available in a piconet might be aggregated by the interconnectivity bridge device and exposed as composite services that represent composite functionality of the piconet, not just individual services available from individual devices in the piconet. An exemplary application is a piconet that includes a scanner, a printer and a phone. The bridge could expose not only scanning, printing and telephony services, but it also might be able to orchestrate these devices and compose their services such that a copying service (scanner+printer) and a fax service (scanner+printer+phone/modem) also could be offered. Web services technology already contains mechanisms for service aggregation that could now be extended to other realms such as Bluetooth piconets.

The bridge also could decompose composite services (the converse of aggregation). For example, it could decompose a fax service into printing, copying, scanning and telephony/modem services. The interconnectivity bridge also could act as a service broker for the Bluetooth piconet; i.e., selecting the "best" service available from devices in the piconet to advertise/match to remote clients who use Web services to access the offered service. Finally, as described earlier, existing Web services also can be made available to non-Web services devices in Bluetooth piconets. Hence, Web applications can expose their services as Web services, which they may desire to do anyway, as Web services proliferate. The interconnectivity bridge then allows Bluetooth devices in the local piconet to take advantage of those services, even though the Bluetooth devices do not natively support Web services protocols. A result is that there are more potential clients for the Web service even though the number of (native) Web services clients has not increased.

Grid-Enabled Ad Hoc Piconet Services

Grid enabled ad hoc piconet services that leverage hyperscatternets according to embodiments of the invention now will be described. As is well known to those having skill in the art, grid technologies enable coordinated resource sharing within a virtual organization. A virtual organization includes multiple organizations, individuals and/or autonomous participants. The Open Grid Services Architecture (OGSA) defines a set of intergrid protocols that promote interoperability across disparate grid implementations. OGSA leverages Web services standards as the underlying and enabling technology for interoperability and integration among distributed grids.

Embodiments of the invention can extend the interconnectivity bridge that enables distributed piconet coupling. These extensions facilitate the participation of Bluetooth services in a grid network topology. Enabling native Bluetooth services for grid computing allows Bluetooth devices and resources to be collaboratively shared across large geographical areas, using a utility service model. Some potential applications are:

Resource sharing among under-utilized gaming systems (e.g. Sony Playstation III) by a community of gamers who opt to participate; and A telematics scenario in which a car containing an internal Bluetooth network has DVD media capabilities and accesses digital movies from a remote Bluetooth network, potentially at the owners residence.

Through the integration of OGSA, Bluetooth and Web Services technologies, collaborative resource sharing within a grid infrastructure may be extended to wireless area networks, thus enabling a variety of scenarios.

Figure 6:
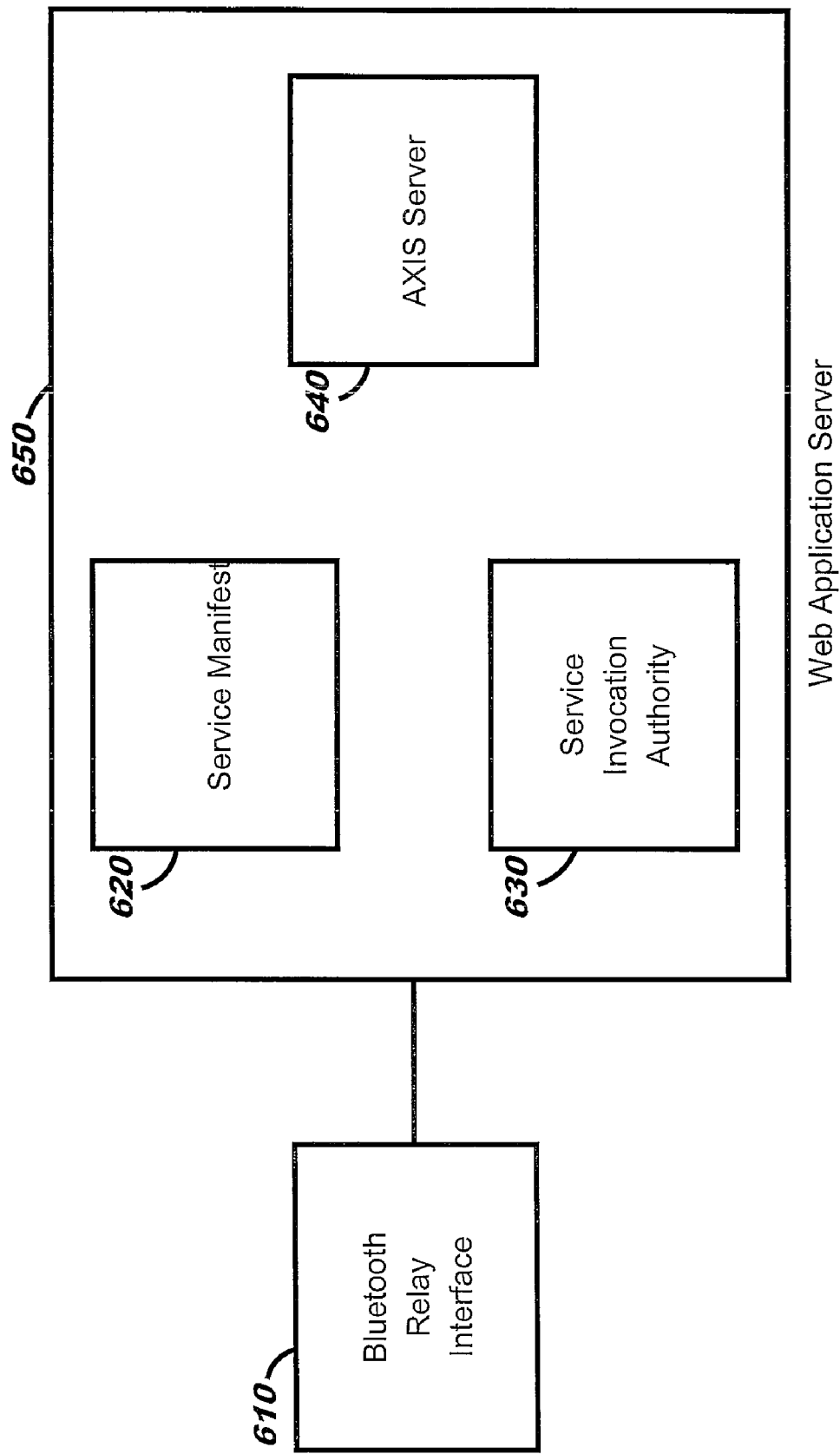
FIG. 6 is a block diagram of an interconnectivity bridge according to some embodiments of the present invention.

Thus, other embodiments of the present invention can modify the interconnectivity bridge of FIG. 6 to include the following components:

Service Manifest (620)—The service manifest is capable of dynamically generating Grid Service References (GSRs) for accessible services within the context piconet. Such GSRs are embodied as WSDL service descriptions with grid-specific extensibility elements. The service manifest registers grid services, leveraging the GSReg. The exemplary service manifest is a grid service deployed within a Web application server that implements the Factory, HandleMap, and Grid-Service port types as defined by the grid services specification. The service manifest advertises, describes, resolves and creates Bluetooth grid services. For example, consider a home network including a home entertainment system and a home security system.

The grid services specification defines a number of port types, which may be implemented by various participants within a grid. The factory port type allows clients to invoke the creation of a remote grid service. The service manifest grid service implements the CreateService Factory port type operation. The operation returns a grid service reference to the newly created service. The service manifest also implements the HandleMap port type, and thus implements the FindByHandle operation. Given a Grid Service Handle (GSH), the FindByHandle operation returns a Grid Service Reference (GSR). Grid services are uniquely and persistently identified by a GSH. The GSH is a URL of the form (GSHomeHandleMapID)/(GSInstanceID). The GSHomeHandleMapID is a base URI that uniquely identifies the grid service implementation's home handleMap service (e.g., daves-house.com/service/bluetooth/grid/handleMap). The GDInstanceID uniquely identifies a grid service implementation relative to a specific handleMap service (e.g., home.entertainment.media.library). A GSR is a WSDL description of a grid service with various extensibility elements. The following represents the service interface component of the GSR for the service manifest grid service implementation. Note that in the following XML code, the symbols "<" and ">" have been replaced with "(" and ")" respectively, and the nomenclature "http" has been replaced by "X", so as to render any otherwise executable code non-extendable by a web browser which displays a web page containing the text of the specification:

```
(?xml version="1.0" encoding="UTF-8"?)
(definitions xmlns=" X://schemas.xmlsoap.org/wsdl/" xmlns:soap="
X://schemas.xmlsoap.org/wsdl/soap/" xmlns:tns=" X://www.daves-
house.com/services/grid/ServiceManifest-Interface" xmlns:xsd="
X://www.w3.org/2001/XMLSchema" name="ServiceManifest-interface"
targetNamespace="")
X://www.daves-house.com/services/grid/ServiceManifest-interface")
(gsdl:serviceType name="ServiceManifest")
(gsdl:portTypeList)
(gsdl:portTypeRef="gsdl:GridService"/)
(gsdl:portTypeRef="gsdl:Factory"/)
(gsdl:portTypeRef="gsdl:HandleMap"/)
(/gsdl:portTypeList)
(gsdl:compatability statementName="
igs:residentialGatewayGridInterop"/)
(/gsdl:serviceType)
(/definitions)
```

Grid Service Registry (GSReg)—The Grid Service registry is a grid service that implements the RegisterService and UnregisterService Registry port type operations. Given a grid service handle, the RegisterService operation will update a WSIL document managed by the GSReg. The registry may contain references to local and remote grid services that have a home handleMap other than the colocated service manifest. The registry grid service would respond to the URL reference daves-house.com/service/bluetooth/manifest.wsil with the following WSIL document:

```
(?xml version="1.0"?)
(inspection xmlns=" X://schemas.xmlsoap.org/ws/2001/10/inspection/"
xmlns:wsiluddi=" ") X://schemas.xmlsoap.org/ws/2001/10/inspection/
uddi/")
(service)
(abstract)Dynamically Generated Bluetooth Home Entertainment System
Service(/abstract)
(description referencedNamespace=" X://schemas.xmlsoap.org/wsdl/"
Location= " ") X://www.daves-house.com/service/bluetooth/
home.entertainment.wsdl"/)
(/service)
(service)
(description referencedNamespace=" X://schemas.xmlsoap.org/wsdl/"
Location=
" ") X://www.daves-house.com/service/bluetooth/home.security.-
system.wsdl" /)
(/service)
(/inspection)
```

Service Invocation Authority (Block 630)—The service invocation authority is a Web service running within the context of an AXIS SOAP runtime. The SIA processes SOAP requests by interacting with the Bluetooth relay service via a Java API.

Bluetooth Relay (Block 610)—The Bluetooth relay is a Bluetooth service that has joined the context piconet and is capable of issuing Bluetooth service queries and service invocations using BSDP. The Bluetooth relay also has connectivity to a larger network that can carry Web services and grid services protocols. The Bluetooth relay component participates in both the Bluetooth piconet and the larger network, and it generates and understands Bluetooth, grid services and Web services protocols and operations. The Bluetooth relay is defined as a service (or set of services). These services often will be instantiated within a physical device. Examples of typical devices that might offer Bluetooth relay services are notebook computers and Bluetooth network access points.

Figure 9:
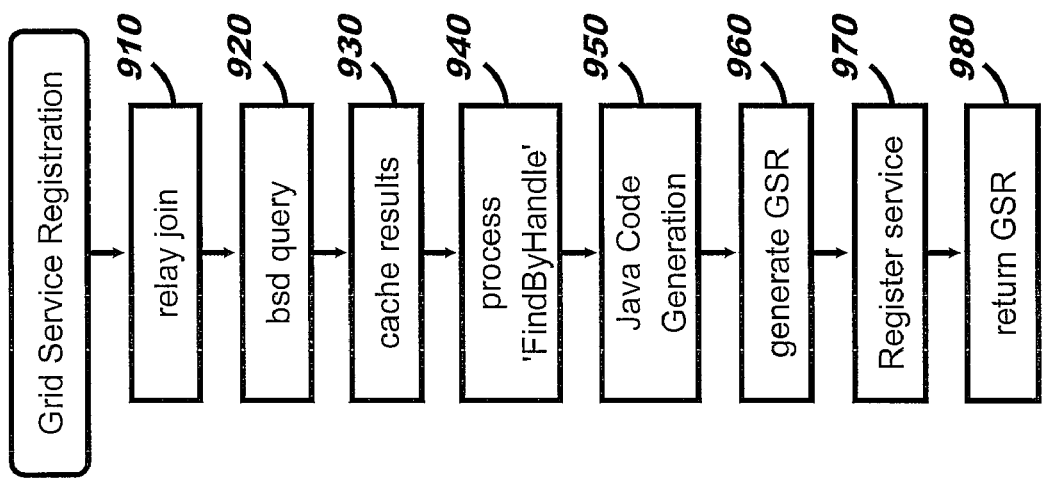

FIG. 9 illustrates an 8-stage operation for advertising or registering Bluetooth services as grid services:

1. Relay Join (Block 910): In this stage the Bluetooth relay device joins a local Bluetooth piconet.

2. BSDP Query (Block 920): The Bluetooth relay issues a Bluetooth service discovery query to other device(s) in the piconet and resolves the available Bluetooth services based on the responses from the other device(s) in the piconet.

3. Cache Results (Block 930): The Bluetooth relay device forwards the descriptions of the service(s) obtained in Block 920 (service meta data) to a repository that is accessible to the service manifest.

4. Process FindByHandle (Block 940): A remote participant within the grid invokes the service manifest FindByHandle operation, providing a GSH as input.

5. Java Code Generation (Block 950): Java code that represents the underlying grid service implementation is generated. This code supports mapping code that interacts directly with the Bluetooth relay. This Java code also implements the GridService port type's SetTerminationTime and Destroy life cycle management methods. The service manifest optionally could be configured to generate Java code that implements the FindServiceData and QueryBySeviceDataName operations. This would allow service data to be exchanged among grid participants.

6. Generate GSR (Block 960): Upon invocation of the FindByHandle method, the service manifest generates a corresponding GSR for the Bluetooth service mapped to the instance ID referenced in the GSH. A GSR that represents a Bluetooth multimedia service is shown next:

(Home Entertainment Service WSDL interface document)
(?xml version="1.0" encoding="UTF-8"?)
(definitions name="davesMultimediaService" targetNamespace=" X://www.daves-house.com/service/bluetooth/davesMultimediaService/"
xmlns=" X://schemas.xmlsoap.org/wsdl/"
xmlns:soap=" X://schemas.xmlsoap.org/wsdl/soap/"
xmlns:soapenc=" X://schemas.xmlsoap.org/soap/encoding/"
xmlns:tns=" X://www.daves-house.com/service/bluetooth/davesMultimediaService/"
xmlns:xsd=" " ") X://www.w3.org/2001/XMLSchema")
(documentation)
This WSDL file was generated by ServiceManifest@www.daves-house.com for Bluetooth Service -davesMultimediaService
(/documentation)
(message name="SearchIn")
(part name="query" type="xsd:string"/)
(/message)
(message name="SearchOut")
(part name="result" type="xsd:string[ ]"/)
(/message)
(message name="StreamMediaIn")
(part name="mediaID" type="xsd:string"/)
(/message)
(message name="StreamMediaOut")
(part name="stream" type="xsd:byte[ ]"/)
(/message)
(message name="downloadMediaIn")
(part name="mediaID" type="xsd:string"/)
(/message)
(message name="downloadMediaOut")
(part name="mediaURI" type="xsd:anyURI"/)
(/message)
(message name="uploadMediaIn")
(part name="mediaID" type="xsd:string"/)
(part name="mediaBuffer" type="xsd:byte[ ]"/)
(/message)
(message name="uploadMediaOut")
(part name="success" type="xsd:boolean"/)
(/message)
(portType name="davesMultimediaService-Service")
(operation name="search")
(input message="tns:SearchIn"/)
(output message="tns:SearchOut"/)
(/operation)
(operation name="streamMedia")
(input message="tns:StreamMediaIn"/)
(output message="tns:StreamMediaOut"/)
(/operation)
(operation name="downloadMedia")
(input message="tns:DownloadMediaIn"/)
(output message="tns:DownloadMediaOut")
(/operation)
(operation name="uploadMedia")
(input message="tns:UploadMediaIn"/)
(output message="tns:UploadMediaOut"/)
(/operation)
(/portType)
(gsdl:serviceType name=" home.entertainment.serviceType")
(gsdl:portTypeList)
(gsdl:PortTypeRef="gsdl:GridService"/)
(gsdl:PortTypeRef="tns:davesMultimediaService-Service"/)
(/gsdl:portTypeList)
(/gsdl:serviceType)
(gsdl:serviceImplementation name=" home.entertainment.serviceImpl" serviceType=" home.entertainment.serviceType")
(gsdl:compatability statementName="bluetooth.media.profile"/) ;
(/gsdl:serviceImplementation)
(binding name="davesMultimediaServiceServiceBinding" type=" tns:davesMultimediaService-Service")
(soap:binding style="rpc" transport=" " ") X://schemas.xmlsoap.org/soap/X"/)
(operation name="search")
(soap:operation soapAction=" ") X://www.daves-house/davesMultimediaService"/)
(input)
(soap:body encodingStyle=" X://schemas.xmlsoap.org/soap/encoding/"
namespace=" X://www.daves-house.com/davesMultimediaService"
use="encoded"/)
(/input)
(output)
(soap:body encodingStyle=" X://schemas.xmlsoap.org/soap/encoding/"
namespace=" X://www.daves-house.com/davesMultimediaService"
use="encoded"/)

```
(/output)
(/operation)
(operation name="streamMedia")
(soap:operation soapAction=" ") X://www.daves-house/davesMultimediaService"/)
(input)
(soap:body encodingStyle=" X://schemas.xmlsoap.org/soap/encoding/"
namespace=" X://www.daves-house.com/davesMultimediaService"
use="encoded"/)
(/input)
(output)
(soap:body encodingStyle=" X://schemas.xmlsoap.org/soap/encoding/"
namespace=" X://www.daves-house.com/davesMultimediaService"
use="encoded"/)
(/output)
(/operation)
(operation name="downloadMedia")
(soap:operation soapAction=" ") X://www.daves-house/davesMultimediaService"/)
(input)
(soap:body encodingStyle=" X://schemas.xmlsoap.org/soap/encoding/"
namespace=" X://www.daves-house.com/davesMultimediaService"
use="encoded"/)
(/input)
(output)
(soap:body encodingStyle=" X://schemas.xmlsoap.org/soap/encoding/"
namespace=" X://www.daves-house.com/davesMultimediaService"
use="encoded"/)
(/output)
(/operation)
(operation name="uploadMedia")
(soap:operation soapAction=" ") ") X://www.daves-house/davesMultimediaService"/)
(input)
(soap:body encodingStyle=" X://schemas.xmlsoap.org/soap/encoding/"
namespace=" X://www.daves-house.com/davesMultimediaService"
use="encoded"/)
(/input)
(output)
(soap:body encodingStyle=" X://schemas.xmlsoap.org/soap/encoding/"
namespace=" X://www.daves-house.com/davesMultimediaService"
use="encoded"/)
(/output)
(/operation)
(/binding)
(/definitions)
(Home Entertainment Service WSDL Implementation Document)
(?xml version="1.0"?)
(definitions name="davesMultimediaService"
targetNamespace=" X://www.daves-house.com/service/bluetooth/davesMultimediaService-
impl/"
xmlns:xsd=" X://www.w3.org/2001/XMLSchema"
xmlns:soap=" X://schemas.xmlsoap.org/wsdl/soap/"
xmlns:interface=" X://www.daves-house.com/service/bluetooth/davesMultimediaService/"
xmlns=" ") X://schemas.xmlsoap.org/wsdl/")
(service name="davesMultimediaService-Service")
(gsdl:instanceOf serviceImplementation="interface: home.entertainment.serviceImpl"
handle=" X://www.daves-house.com/service/bluetooth/grid/handleMap
/home.entertainment.media.library" expiration=" 2002-05-22T13:20:00-05:00"/)
(port name="port0" binding=" interface:davesMultimediaServiceServiceBinding")
(soap:address location="X :// ") www.daves-house.com/service-invocation-
authority/davesMultimediaService" /)
(/port)
(/service)
(/definitions)
```

7. Register Service (Block 970): The Bluetooth-to-grid mapped service is registered with the registry service.

8. Return GSR (Block 980): The generated GSR is returned to the caller.

Some embodiments of the invention can expose Bluetooth piconet services to grid services. A robust interconnectivity bridge can generate hyper-scatternets that interoperate using grid services. This can bring the full power of grid services to Bluetooth piconets that are composed of devices that cannot or do not natively support grid services. By exposing Bluetooth services to grid services, the interconnectivity bridge can take advantage of accessible grids, using standard Web services and grid services protocols, operations and descriptions. The fact that the services that are discovered and accessed happen to use Bluetooth protocols is hidden from the service client. It uses the same grid services protocols and operations to access the Bluetooth services as it does to access other grid services. Moreover, as described below, these embodiments can be applied to other service-oriented architectures besides Bluetooth protocols. The overall result is that more services can appear to more clients, yet those clients do not need to implement multiple protocols to find and use those services.

Embodiments of the invention can be instantiated to bridge to protocols and technologies other than Bluetooth—for example, UPnP networks. Although embodiments of the invention detailed herein perform Bluetooth piconet to grid bridging, the principles of the invention could be applied to perform "Protocol X" to grid bridging as well.

Embodiments of the invention can therefore provide the ability to interconnect multiple, diverse, geographically distributed Bluetooth piconets into multiple grids via interconnectivity bridges using standard protocols and operations. Bluetooth technology does not by itself offer this function. Bluetooth technology typically is implemented in small, mobile, resource-constrained devices that generally cannot afford to have robust software stacks that natively support grid computing. By using embodiments of invention, Bluetooth piconets that otherwise could not participate in grids are able to do so.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer program product for connecting an ad hoc piconet with a wide area network, the computer program product comprising a computer usable storage memory having computer-readable program code embodied in the memory, the computer-readable program code comprising:
    computer-readable program code that is configured to determine ad hoc piconet services that are available from the ad hoc piconet;
    computer-readable program code that is configured to advertise the ad hoc piconet services to the wide area network as wide area network services;
    computer-readable program code that is configured to map a service invocation that is received from a client in the wide area network to an ad hoc piconet protocol;
    computer-readable program code that is configured to invoke the service on the ad hoc piconet;
    computer-readable program code that is configured to receive a response from the ad hoc piconet; and
    computer-readable program code that is configured to provide the response to the client using a wide area network protocol.

2. A computer program product according to claim 1 further comprising:
    computer-readable program code that is configured to aggregate ad hoc piconet services that are available from multiple clients that are connected to the ad hoc piconet; and
    computer-readable program code that is configured to advertise the ad hoc piconet services that are aggregated to the wide area network as wide area network services.

3. A computer program product according to claim 1 wherein the wide area network comprises the World Wide Web, a grid computing network and/or a universal plug and play network.

4. An application server comprising:
    an ad hoc piconet interface that is configured to communicate with an ad hoc piconet using ad hoc piconet protocol;
    a wide area network interface that is configured to communicate with a wide area network using wide area network protocol; and
    a service manifest that is configured to determine first ad hoc piconet services that are available from the ad hoc piconet via the ad hoc piconet interface and to advertise the first ad hoc piconet services to the wide area network as first wide area network services via the wide area network interface and/or to determine second wide area network services that are available from the wide area network via the wide area network interface and to advertise the second wide area network services to the ad hoc piconet as second ad hoc piconet services via the ad hoc piconet interface.

5. An application server according to claim 4 further comprising:
    a service invocation authority that is responsive to a first service invocation for a first service that is received from a first client in the wide area network via the wide area network interface, to map the first service invocation to the ad hoc piconet protocol, to invoke the first service on the ad hoc piconet via the ad hoc piconet interface, to receive a first response from the ad hoc piconet and to provide the first response to the first client using the wide area network protocol via the wide area network interface, and/or is responsive to a second service invocation for a second service that is received from a second client in the ad hoc piconet via the ad hoc piconet interface, to map the second service invocation to the wide area network protocol, to invoke the second service on the wide area network via the wide area network interface, to receive a second response from the wide area network and to provide the second response to the second client using the ad hoc piconet protocol via the ad hoc piconet interface.

6. An application server according to claim 4 wherein the service manifest is further configured to aggregate ad hoc piconet services that are available from multiple clients that are connected to the ad hoc piconet via the ad hoc piconet interface and to advertise the ad hoc piconet services that are aggregated to the wide area network as wide area network services via the wide area network interface.

7. An application server according to claim 4 wherein the wide area network comprises the World Wide Web, a grid computing network and/or a universal plug and play network.

8. A hyper scatternet comprising:
    a first ad hoc piconet;
    a second ad hoc piconet; and
    a wide area network;
    wherein the first and second ad hoc piconets are configured to communicate with one another via the wide area network;
    wherein each of the first and second ad hoc piconets comprises:
        an ad hoc piconet interface that is configured to communicate with the ad hoc piconet using ad hoc piconet protocol;
        a wide area network interface that is configured to communicate with the wide area network using wide area network protocol; and
        a service manifest that is configured to determine first ad hoc piconet services that are available from the ad hoc piconet via the ad hoc piconet interface and to advertise the first ad hoc piconet services to the wide area network as first wide area network services via the wide area network interface and/or to determine second wide area network services that are available from the wide area network via the wide area network interface and to advertise the second wide area network services to the ad hoc piconet as second ad hoc piconet services via the ad hoc piconet interface.

9. A hyper-scatternet according to claim 8 wherein the service manifest is further configured to aggregate ad hoc piconet services that are available from multiple clients that are connected to the ad hoc piconet via the ad hoc piconet interface and to advertise the ad hoc piconet services that are aggregated to the wide area network as wide area network services via the wide area network interface.

10. A hyper scatternet according to claim 8 wherein the wide area network comprises the World Wide Web, a grid computing network and/or a universal plug and play network.

11. An ad hoc piconet application server comprising:
an ad hoc piconet interface that is configured to communicate with an ad hoc piconet using an ad hoc piconet protocol;
a grid computing network interface that is configured to communicate with a grid computing network using Open Grid Services Architecture (OGSA) protocol; and
a service manifest that is configured to determine first ad hoc piconet services that are available from the ad hoc piconet via the ad hoc piconet interface and to advertise the first ad hoc piconet services to the grid computing network as first grid computing network services via the grid computing network interface and/or to determine second grid computing network services that are available from the grid computing network via the grid computing network interface and to advertise the second grid computing network services to the ad hoc piconet as second ad hoc piconet services via the ad hoc piconet interface.

12. An ad hoc piconet server according to claim 11 further comprising:
a service invocation authority that is responsive to a first service invocation for a first service that is received from a first client in the grid computing network via the grid computing network interface, to map the first service invocation to the ad hoc piconet protocol, to invoke the first service on the ad hoc piconet via the ad hoc piconet interface, to receive a first response from the ad hoc piconet and to provide the first response to the first client using the OGSA protocol via the grid computing network interface, and/or responsive to a second service invocation for a second service that is received from a second client in the ad hoc piconet via the ad hoc piconet interface, to map the second service invocation to the OGSA protocol, to invoke the second service on the grid computing network via the grid computing network interface, to receive a second response from the grid computing network and to provide the second response to the second client using the ad hoc piconet protocol via the ad hoc piconet interface.

13. An ad hoc piconet server according to claim 11 wherein the service manifest is further configured to aggregate ad hoc piconet services that are available from multiple clients that are connected to the ad hoc piconet via the ad hoc piconet interface and to advertise the ad hoc piconet services that are aggregated to the grid computing network as grid computing network services via the grid computing network interface.

* * * * *